M. NEUNER.
DOUBLE WALLED VESSEL.
APPLICATION FILED JUNE 27, 1908.
909,203.
Patented Jan. 12, 1909.
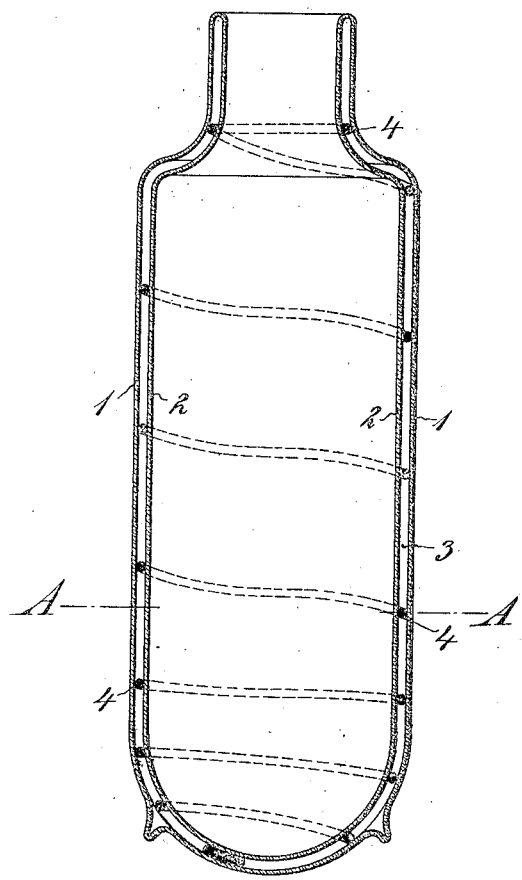
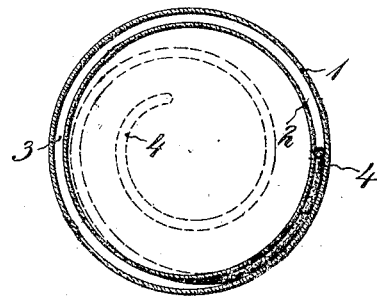

UNITED STATES PATENT OFFICE.

MAX NEUNER, OF CHARLOTTENBURG, GERMANY, ASSIGNOR TO AMERICAN THERMOS BOTTLE COMPANY, OF BROOKLYN, NEW YORK.

DOUBLE-WALLED VESSEL.

No. 909,203.

Specification of Letters Patent.

Patented Jan. 12, 1909.

Application filed June 27, 1908. Serial No. 440,662.

*To all whom it may concern:*

Be it known that I, MAX NEUNER, a subject of the German Emperor, and resident of Charlottenburg, near Berlin, Germany, have invented a new and useful Improvement in Double-Walled Vessels, of which the following is a specification.

This invention consists in a double walled vessel comprising inner and outer walls united with each other only at the mouth of the vessel and inclosing between them a rarefied space, a stiffening cord of non-heat-conducting material being spirally arranged between the inner and outer walls for holding the inner wall spaced from the outer wall.

In the accompanying drawings, Figure 1 represents a double walled vessel in vertical central section with the spiral stiffening cord applied thereto, and Fig. 2 is a section taken in the plane of the line A—A of Fig. 1 looking in the direction of the arrows.

The outer wall of the vessel is denoted by 1, the inner wall by 2 and the rarefied space between the inner and outer walls by 3. These inner and outer walls are united with each other only at the mouth of the vessel. A stiffening cord 4 is spirally arranged between the inner and outer walls for holding the inner wall spaced from the outer wall along the entire length of the vessel without unduly filling up the rarefied space between the two walls. This stiffening cord is composed of some non-heat-conducting material, preferably an elastic material such, for instance, as asbestos.

What I claim is:—

A double walled vessel comprising inner and outer walls united with each other only at the mouth of the vessel and inclosing between them a rarefied space, and a stiffening cord of non-heat-conducting material spirally arranged between the inner and outer walls.

In testimony, that I claim the foregoing as my invention, I have signed my name in presence of two witnesses, this sixth day of June 1908.

MAX NEUNER.

Witnesses:
 HEINRICH RAUCHHOLT,
 WOLDEMAR HAUPT.